United States Patent
Giordano et al.

[11] Patent Number: 5,817,747
[45] Date of Patent: Oct. 6, 1998

[54] COOLING PROCESS FOR POLYESTER AND/OR POLYMIDE RESINS

[75] Inventors: Dario Giordano; Giuseppina Boveri, both of Tortona, Italy

[73] Assignee: Sinco Engineering S.p.A., Italy

[21] Appl. No.: 951,800

[22] Filed: Oct. 16, 1997

[30] Foreign Application Priority Data

Oct. 18, 1996 [IT] Italy .................................. MI96A2158

[51] Int. Cl.$^6$ .................................. C08F 6/00; C08J 3/00
[52] U.S. Cl. .................................. 528/503; 528/296; 528/298;
528/302; 528/308; 528/308.2; 528/308.3;
528/308.6; 528/335; 528/350; 528/480;
528/491; 528/492
[58] Field of Search .................................. 528/296, 298,
528/302, 308, 308.2, 308.3, 308.6, 335,
350, 480, 491, 492, 503

[56] References Cited

U.S. PATENT DOCUMENTS 4,161,578 7/1979 Herron .
5,516,880 5/1996 Walsh .
5,547,652 8/1996 Ghisolfi et al. .
B1 4,064,112 10/1993 Rothe et al. .

FOREIGN PATENT DOCUMENTS 0 038 094 3/1981 European Pat. Off. .
0717061A2 6/1996 European Pat. Off. .

OTHER PUBLICATIONS

Nylon 6 Polymerization In The Solid State, by Gaymans, Amirtharaj, and Kamp; Journal of Applied Polymer Sciences, vol. 27, 2513–2526 (1982).

Primary Examiner—Samuel A. Acquah
Attorney, Agent, or Firm—Edward D. Manzo; Mark J. Murphy

[57] ABSTRACT

Cooling process for polyester and/or polyamide resins downstream of solid-state polycondensation plants in which the cooling is carried out by passing the solid material through two types of equipment in series, of which one is a fluid-bed, the other is a solid/wall cooling equipment. The fluid bed equipment is fed with a stream of inert-gas coming from the solid-state polycondensation reactor, previously subjected to by-products purification, drying and cooling.

15 Claims, 4 Drawing Sheets

COOLING PROCESS FOR POLYESTER AND/OR POLYMIDE RESINS

DESCRIPTION

This invention refers to an improved process for the solid state polycondensation of polyester and/or polyamide resins wherein the cooling of the granule at the end of the solid-state polycondensation reactor is carried out by passing the granule through two types of equipment in series, of which one at least is fluid-bed, and the other is a solid/wall cooling equipment.

It is well known that aromatic polyester resins, particularly polyethylene terephtalate (PET), the copolymers of terephtalitic acid with lower proportions of isophthalic acid and polybutylene terephtalate, find wide application in both the fiber and film fields and as material for molding.

While for fibers and films the intrinsic viscosity values of the resin are in general between 0.6–0.75 dl/g, higher values are necessary for molding material; values that only with difficulty can be obtained directly through the resin polycondensation process. The intrinsic viscosity is brought to the desired values (generally higher than 0.75 dl/g) by means of solid state polycondensation treatment of the resin (SSP) operating at temperatures generally between 190° and 230° C. The starting resin utilised for the SSP treatment is in an amorphous state; it needs therefore to be brought to a sufficient degree of crystallization before undergoing the SSP treatment.

Crystallization is necessary to avoid the packing of the polymer granules in the polycondensation reactor, which generally consists of a vertical mobile bed into which the polymer is introduced from above. Inert gas is then introduced in order to remove volatile by-products generated by the polycondensation reaction (ethylene glycole, acetaldehyde if polyethylene terephtalate is used).

The removal of the by-products polycondensation reaction is an essential requirement for the development of the reaction itself; they are removed by passing a flow of gas downstream or upstream with the feeding of the polymer exiting from the crystallization stage.

Various reactions occur during polycondensation.

The main one that leads to an increase in the molecular weight of PET is the elimination of ethylene glycol:

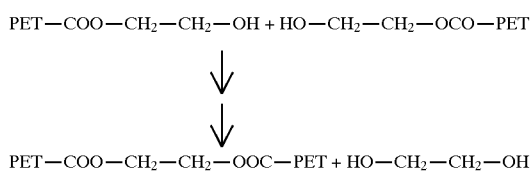

The polycondensation reaction is generally carried out in a tubolar mobile-bed reactor wherein the polymer enters from above and exits from underneath with a flow of inert gas passing over the polymer.

Processes like this one are known from U.S. Pat. No. 4,064,112 in which the granular polymer is crystallized to a density of at least 1.390 g/cm$^3$ operating in forced movement crystallizers heated to a temperature ranging between 220° and 260° C. and then conducting the polycondensation reaction in a fluid-bed reactor operating at temperatures equal to or lower than those used in the crystallization stage.

The operation is carried out in particular at a temperature of between 230° and 245° C. in order to obtain cristallinity values corresponding to a density of 1.403–1.415 g/cm$^3$, and at a temperature of between 230° and 245° during the polycondensation stage in order to obtain an optimal reaction rate combined with a low degree of polymer degradation.

An inert gas, preferably nitrogen, is utilised to remove the by-products formed during the polycondensation stage. The gas is recycled after purification of the by-products.

U.S. Pat. No. 4,161,578 too, describes a solid-state crystallization/polycondensation process in which the polymer in granules is crystallized with a forced circulation apparatus at temperatures of between 180° and 235° C. to obtain a degree of cristallinity corresponding to at least a density of 1.385 g/cm$^3$ and the polymer is subsequently fed into a fluid-bed polycondensation reactor where it is heated at temperatures higher than those used in the crystallization stage.

In the polycondensation reactor nitrogen is made to flow upstream with the feeding of the polymer, with a flow rate weight ratio between 0.7 and 3.5 kg $N_2$/kg PET.

In EP-A-0 717 061 this ratio is lower than 0,6.

It is also well known that polyamide resins, and among them particularly PA6, PA6.6, PA11, PA12 and their copolymers, find wide application both in the fiber and flexible packaging sectors, and in the manufactured articles production by blow and extrusion technology.

While the resin relative viscosity for fibers is low (RV= 2.4/3.0), higher relative viscosity (RV 3.2/5.0) is needed for articles produced by blow and extrusion technologies.

The relative viscosity is brought to the required values (higher than 3.0) by means of solid state polycondensation treatment of the resin (SSP) operating at temperatures of between 140° and 230° C., depending on the polyamide types used.

Solid state polycondensation processes are known, from EP-A-0 038 094, for example, which describes a solid state polycondensation process and different methods to accelerate this reaction.

The solid-state treatment process of polyamide resins is also described in the article "Nylon & Polymerization in the Solid State" (R. J. Gaymans, J. Amirtharaj et al., All. Polym. Sci 27,2513-1982) which point out the use of nitrogen as a heating and flushing aid. The reaction is carried out at 145° C.

For the utilisation and/or treatment of the polymer exiting from the SSP reactor, it is necessary to cool the polymer to temperatures lower than 60°.

It is also advantageous to carry out at least one stage of cooling using a fluid-bed system as so to eliminate, by means of the dedusting action of the fluidization gas, the polymer dust formed in the processing apparatuses both because of the action of the rotating parts in contact with the solid material, and because of the sliding friction between the solid and the postpolycondensation reactor walls.

BRIEF DESCRIPTION OF DRAWINGS

The usual scheme utilised for the solid-state postpolycondensation processes is displayed in FIG. 1.

The solid material exiting fom the polymerization reactor 10 is unloaded into the cooling fluid- bed 12 where it is cooled by a gas flow 62, preferably nitrogen, at a low temperature. The exiting gas 63 has a temperature of about 50°:60° C. higher than the entering gas 62.

Figure 1:
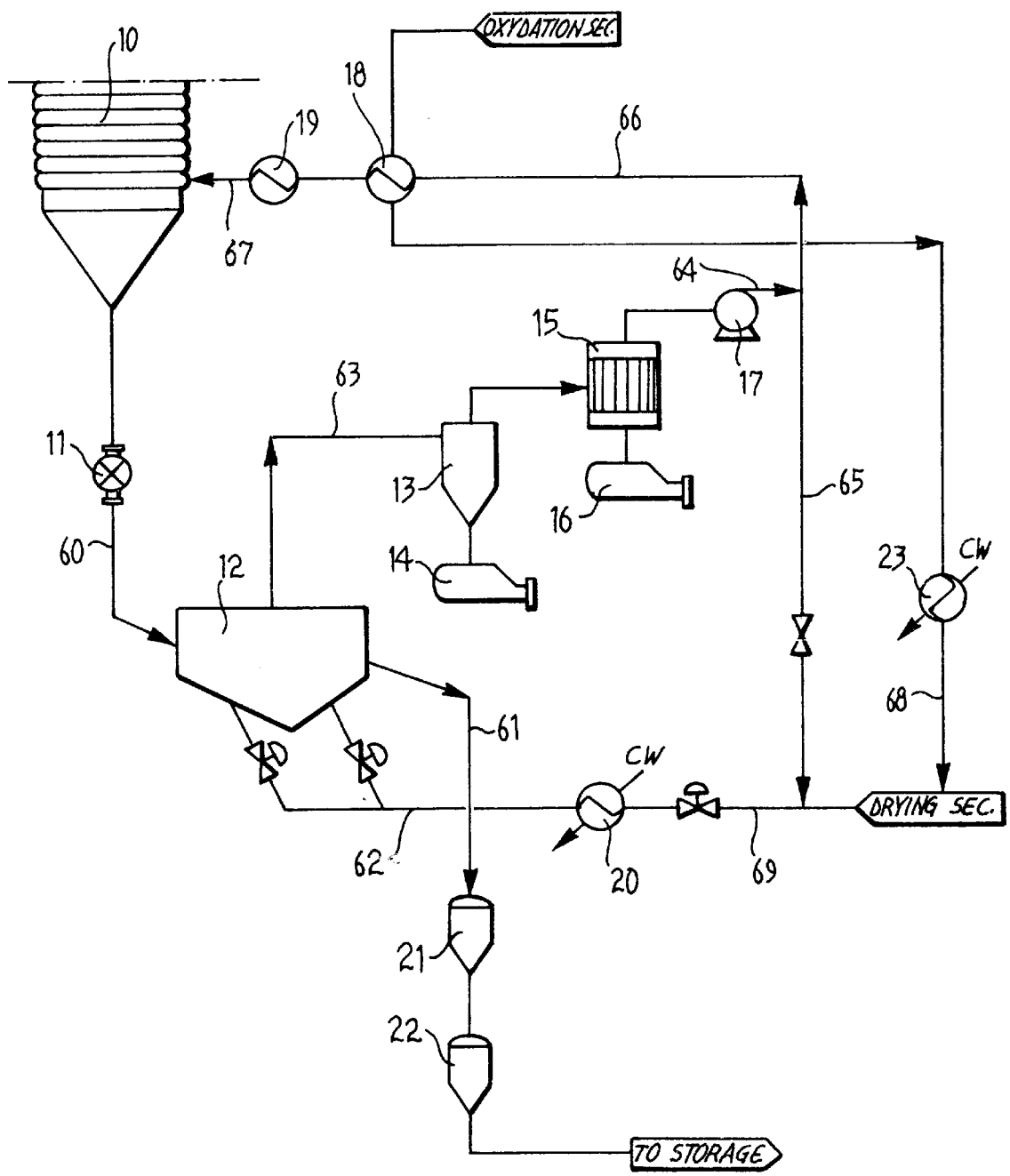

The main part of the gas flow 63 is recirculated into the cooling section, and the remaining part is sent to the reactor 10. The recycled gas is combined with the flow coming from the drying section 68, and the resulting flow 69 is cooled by means of cooler 20.

The gas sent to reactor 66 is reheated in 19 until it reaches the temperature needed in the reactor.

Solid material 61 exiting the cooling fluid-bed 12 is at a temperature of 50°:60° C. and is dedusted. One of the disadvantages of this system is that it is necessary to keep a large amount of gas in circulation; furthermore it does not optimize the thermal recovery of the heat lost from the solid to the gas.

In effect, the gas circulating in the cooling bed is only partially composed of the gas coming from the SSP reactor after purification of its by-products, and mainly of a supplementary flow.

U.S. Pat. No. 5,516,880 describes a solution which, by the use of a fluid-bed of particular design, allows energy saving of about 37% compared to the traditional solution.

This solution, however, requires keeping in circulation large quantity of gas.

It has now been discovered that it is possible to obtain with high energy yield an efficient cooling and dedusting of the polymer leaving an SSP reactor, operating with a series of at least two cooling apparatuses, where one is a fluid-bed and the other one a solid/wall cooling apparatus, without loss of the final product properties.

The fluid-bed cooling equipment is fed with the cold flow of the inert flowing gas coming from the SSP reactor, after purification of by-products and drying, so as to eliminate the water formed during the purification treatment.

Figure 2:
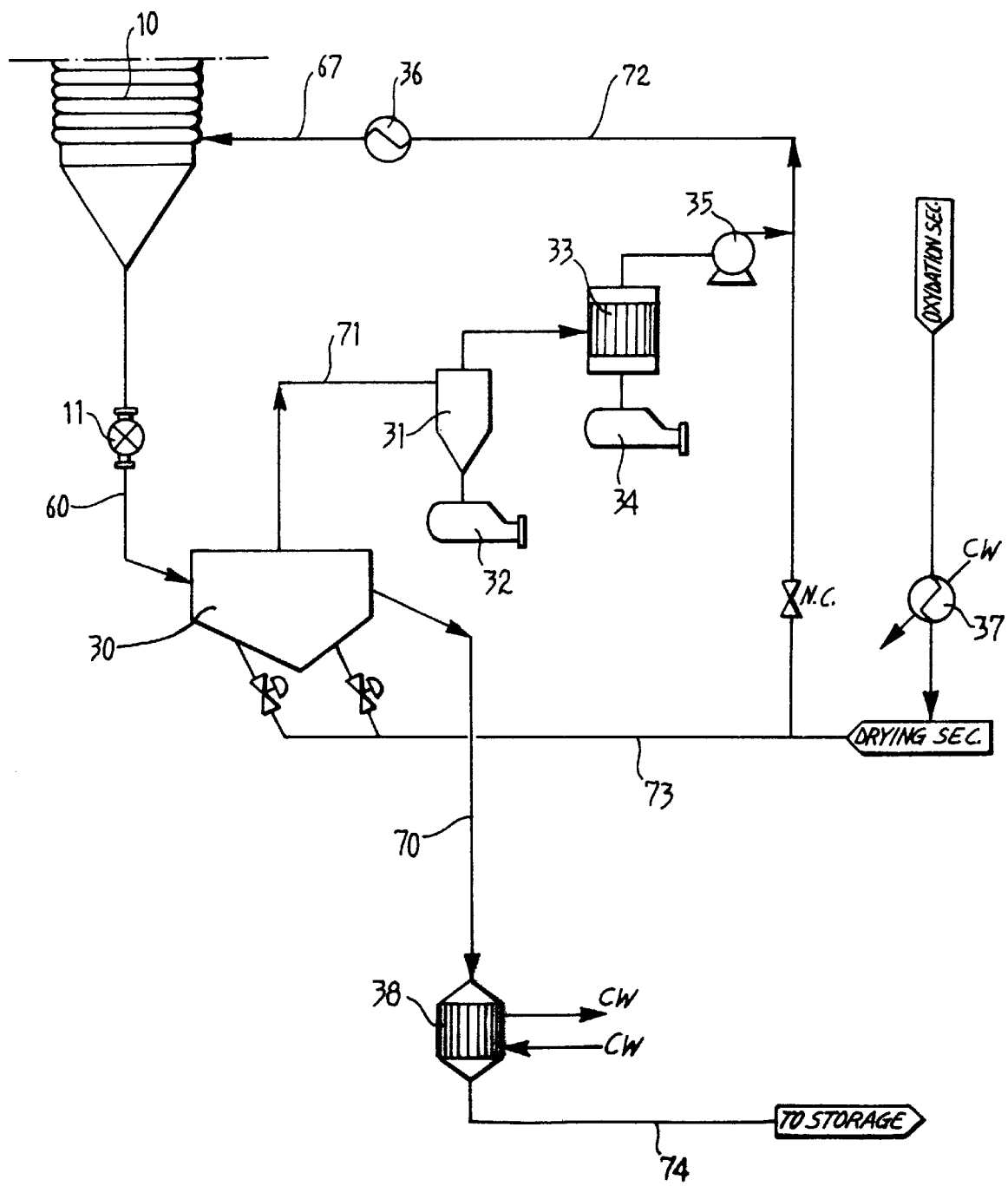

A diagram of this process is displayed in FIG. 2.

The solid material leaving polymerization reactor 10 is unloaded into a cooling fluid-bed, where it is partially cooled by a flow of nitrogen 73 coming from the SSP reactor, after purification of its by-products, drying and cooling at room temperature.

This flow is much less than that usually utilised in the traditional schemes (FIG. 1, flow 62). The weight ratio between flows 62 and 73 is usually between 1:8 and 1:12.

The nitrogen flow leaving fluid-bed 71 is heated to a higher temperature than that of flow 63. Exiting gas 71 usually has a temperature of about 100°÷170° C. higher than the arriving gas 73, which is usually cooled at room temperature.

This flow is totally, or nearly totally, sent to the postpolymerization reactor 10, after having had its temperature adjusted in 36.

The solid material 70 leaving the cooling fluid-bed 38 is sent to a second cooling stage composed of a static-bed 38 where the cooling fluid, usually cooling water, is sent into the shell while the solid material passes through the tubes.

The solid is cooled at a temperature lower than 70° C.

The solid material 74 leaving the cooling bed 38 usually has a temperature of between 40° and 60° C.

Figure 4:
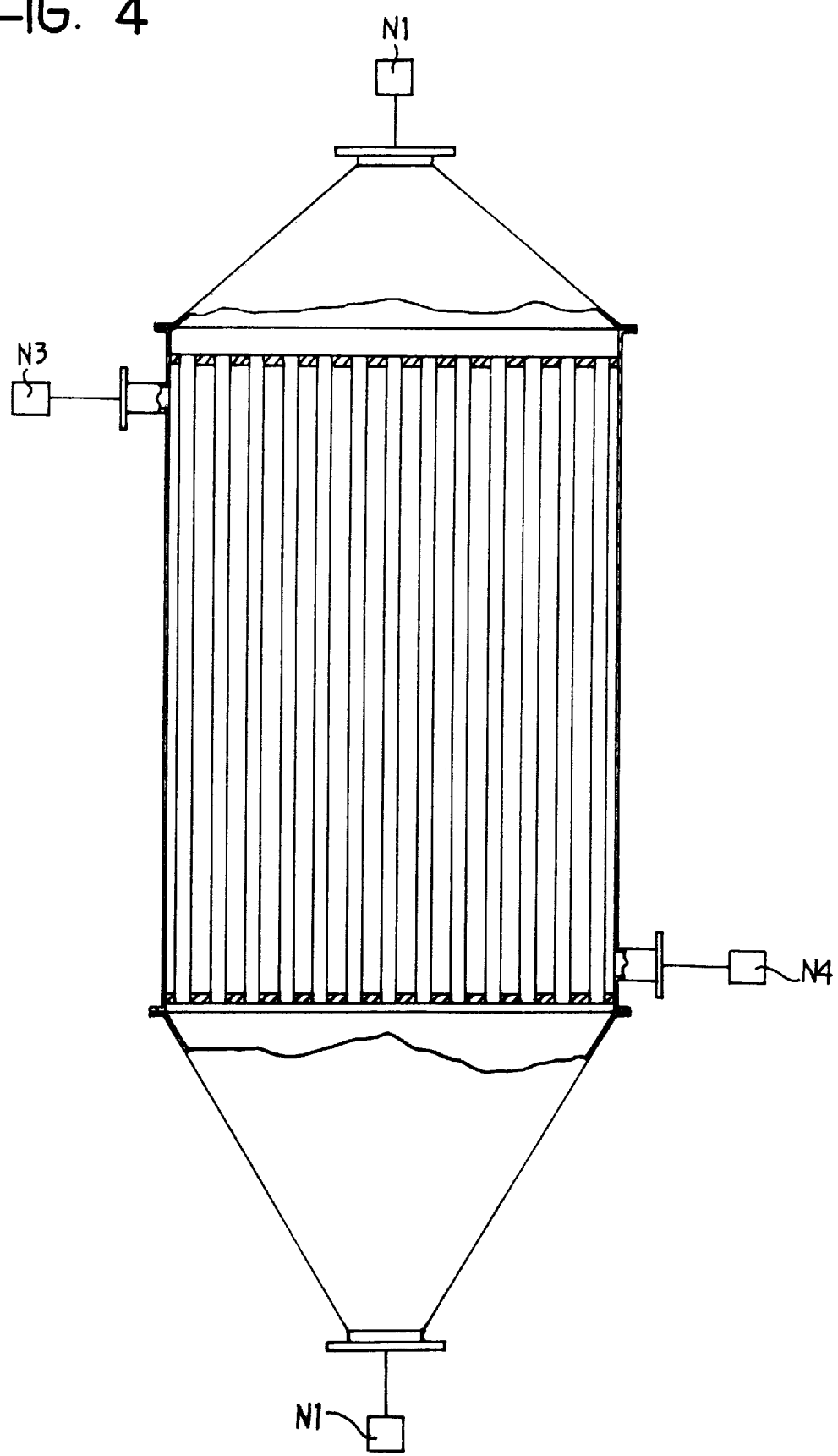

Alternatively it is possible to utilise plate apparatuses or any other type of solution, where the cooling of the chips is realised through contact with a surface cooled by a cooling fluid (solid/wall cooling). An example of this type of this heat-exchanger is reported in FIG. 4.

The purification of the gas flow coming from the SSP reactor is carried out according to the usual procedures. First of all the flow is sent to a reactor for the catalytic oxidation of its by-products and then to a hydrogenation reactor, if an excess of oxygen is used, or directly to a drying stage to eliminate the water formed during the oxidation stage, if the oxygen used for the oxidation is stoichiometric or slightly larger.

A suitable method is described in U.S. Pat. No. 5,547,652, the description of which is herewith incorporated by reference.

Using for cooling the solid a solution of the known type as reported in FIG. 1 the energetic consumption is of 18.2 kWh per ton of product. Said consumption is in general between 15 and 25 kWh per ton of product.

Operating according to the process of the invention, the consumption is, on the contrary, between 4 and 8 kWh per ton of product and particularly of 6.9 kWh referring to the scheme in FIG. 2.

In this case the energy saving is 62% compared to the consumption of the process of FIG. 1.

Moreover, the cooling process of this invention is particularly suitable if a part of the product is used directly, without being cooled to 60° C.

In fact, the material leaving the fluid-bed is dedusted and it is at a temperature of about 160°–180° C. so that it can be used, without further drying treatment, to feed the extruders of injection molding, extrusion, blowing, spinning or filming sections.

Figure 3:
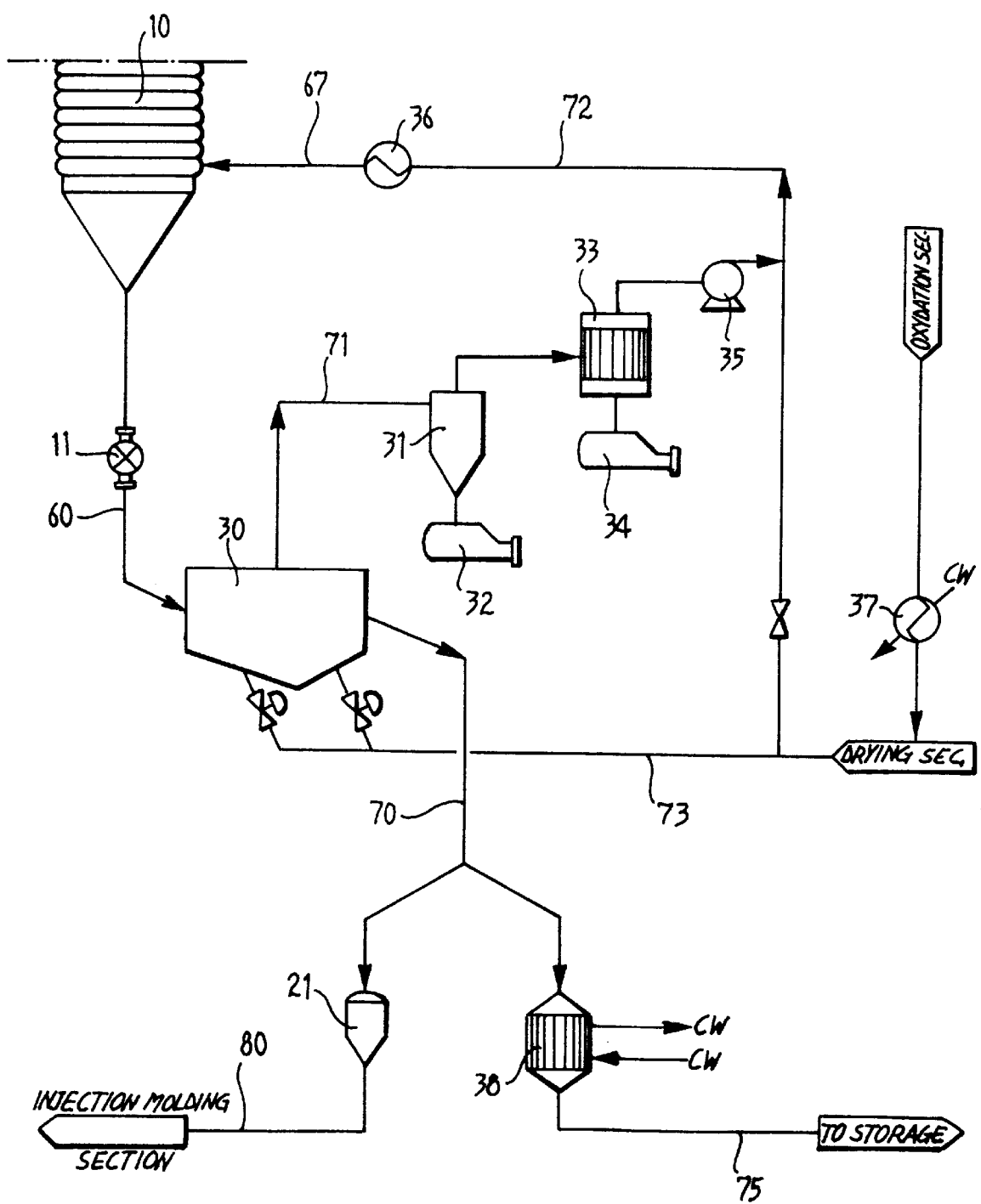

FIG. 3 is an examplification of this solution.

The polyester resins used in the process of the invention are the products of polycondensation of a diol with 1–12 carbon atoms, such as ethylenic glycole, 1,4 butanediol, 1,4 dimethylol-cyclohexane, with aromatic dicarboxylic acids, such as terephthalic acid and the naphthalene dicarboxylic acids.

The preferred resins are polyethylene terephtalate, polybutylene terphthalate, and the ethylene terephthalate copolymers where up to 15%, by moles of units deriving from terephthalate acid, are substituted with units deriving from isophthalic acid and/or 1,6 naphthalene dicarboxylic acid.

In order to improve the kinetics of solid-state polycondensation, a dianhydride of an aromatic tetracarboxylic acid is added to the resins to be subjected to SSP, in amount from 0,05 to 2% by weight.

The best additive is pyromellitic anhydride.

Other additives can be used, such as dyes, antioxidants, nucleants, flame retardant agents, and all the additives usually used in the polyester resins field.

The polyamide resins to which the process of the invention is applicated are, preferably polyamide 6 (derived from caprolactame) 66 (obtained from hexamethylenediamine and adipic acid), 11 (from aminoundecanoic acid), 12 (polylaurilactone) copolyamides 6/10 and 10/12.

What is claimed is:

1. Process for cooling and dedusting polyamide and/or polyester resins exiting solid-state polycondensation reactors, characterised in that the solid material leaving the reactor is cooled at temperatures lower than 70° C., by passing trough a series of at least two cooling apparatuses, of which one at least is a fluid-bed apparatus fed with an inert gas flow coming from the solid-state polycondensation reactor, after purification from its reaction by-products, and the other is a solid/wall cooling equipment.

2. Process according to claim 1, wherein the cooling is carried out in a series of two equipments, of which the first is a fluid-bed apparatus and the second is a static-bed apparatus.

3. Process according to claim 2, wherein the fluid-bed apparatus is fed with an inert gas selected from nitrogen, carbon dioxide and a mixture thereof.

4. Process according to claim 1, wherein the polymer leaving the cooling fluid-bed apparatus is at a temperature of 170°–180° C. and is then led to an exit temperature of about 60° in the solid/wall cooling equipment.

5. Process according to the claim 1, wherein the polyester resin is polyethylene terephthalate, polybutylene-terephthalate, polyethylene-naphthenate or terephthalate copolymers, whose units deriving from terephthalic acid are substituded up to 15% by moles with units deriving from isophthalic and/or naphthalene-dicarhboxylic acid.

6. Process according to the claim 1, wherein a tetracarboxylic acid dianhydride is added in amount from 0,01 to 1% by weight to the polyester resin undergoing the solid-state polycondensation reaction.

7. Process according to the claim 6, wherein the dianhydride is pyromellitic dianhydride.

8. Process according to the claim 1, wherein the resin is a polyamide selected from the group consisting of polyamide 6, 66, copolyamide 6/66, polyamide 11 and 12, copolyamide 6/11, copolyamide 6/12, copolyamide 10/10 and copolyamide 10/12.

9. Process according to the claim 1, wherein a part of the solid material leaving the fluid-bed is fed to an extrusion or injection unit, and the remaining part is sent to one or more solid/wall cooling equipments.

10. Process according to claim 9, wherein the value of the temperature of the solid material leaving the fluid-bed is between 160° and 180° C.

11. Process according to claim 9, wherein the injection unit comprises one or more injection apparatuses.

12. Process according to claim 2, wherein the polymer leaving the cooling fluid-bed apparatus is at a temperature of 170°–180° C. and is then led to an exit temperature of about 60° in the solid/wall cooling equipment.

13. Process according to claim 2, wherein a tetracarboxylic acid dianhydride is added in amount from 0,01 to 1% by weight to the polyester resin undergoing the solid-state polycondensation reaction.

14. Process according to the claim 13, wherein the dianhydride is pyromellitic dianhydride.

15. Process according to the claim 2, wherein a part of the solid material leaving the fluid-bed is fed to an extrusion or injection unit, and the remaining part is sent to one or more solid/wall cooling equipments.

* * * * *